United States Patent [19]

Ichikawa

[11] Patent Number: 4,823,798
[45] Date of Patent: Apr. 25, 1989

[54] DIAGNOSING SYSTEM FOR AN EXHAUST GAS RECIRCULATION SYSTEM OF AN AUTOMOTIVE ENGINE

[75] Inventor: Kazuharu Ichikawa, Tokyo, Japan

[73] Assignee: Fuji Jukogyo Kabushiki Kaisha, Tokyo, Japan

[21] Appl. No.: 25,361

[22] Filed: Mar. 12, 1987

[30] Foreign Application Priority Data

Mar. 12, 1986 [JP] Japan .................. 61-54130

[51] Int. Cl.⁴ .............................. F02B 47/08
[52] U.S. Cl. .................. 123/571; 137/554; 340/686
[58] Field of Search ........... 123/571; 137/554; 340/686, 942

[56] References Cited

U.S. PATENT DOCUMENTS

| | | | |
|---|---|---|---|
| 2,497,375 | 2/1950 | Seguin | 137/554 |
| 3,737,851 | 6/1973 | Marshall | 340/942 |
| 3,846,774 | 11/1974 | Thorbard | 137/554 |
| 4,613,103 | 9/1986 | Waranowitz | 340/942 |
| 4,665,882 | 5/1987 | Otobe | 123/571 |

FOREIGN PATENT DOCUMENTS

| | | | |
|---|---|---|---|
| 55-123345 | 9/1980 | Japan . | |
| 185857 | 10/1984 | Japan | 123/571 |
| 57085 | 4/1985 | Japan | 137/554 |

Primary Examiner—Douglas Hart
Attorney, Agent, or Firm—Martin A. Farber

[57] ABSTRACT

An exhaust gas recirculation system has an EGR passage communicating an exhaust pipe of an engine with an intake passage of the engine, an EGR valve provided in the EGR passage, and control means for producing a valve operating signal for operating the EGR valve in accordance with engine operating conditions. A photoelectric transducer is provided for detecting the position of the EGR valve and for producing a position signal dependent on the position of the EGR valve. A control unit is provided to respond to the valve operating signal and to the position signal for producing a trouble signal as an alarm signal when the photoelectric transducer produces a position signal representing a valve state which does not accord with the valve operating signal.

9 Claims, 2 Drawing Sheets

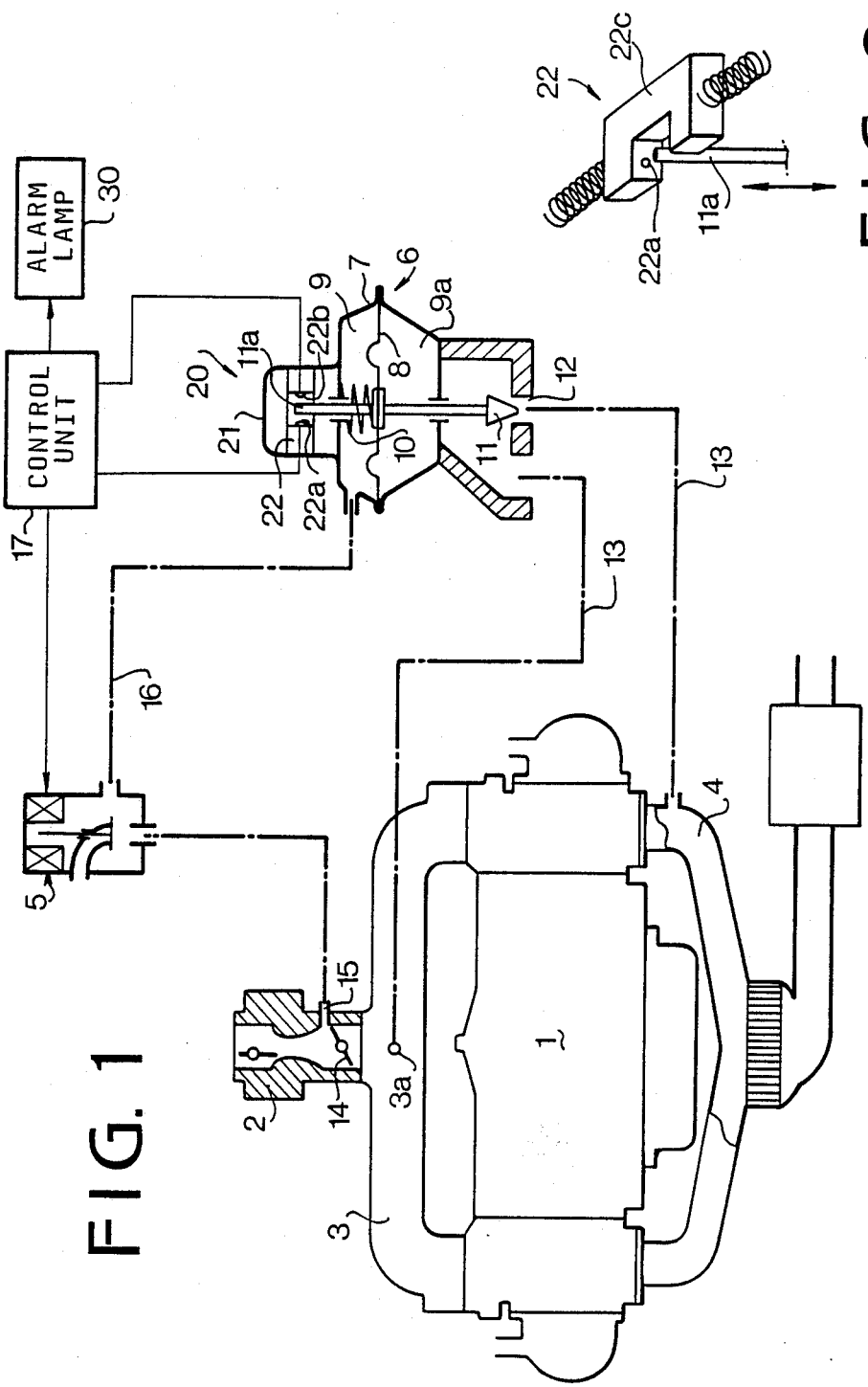

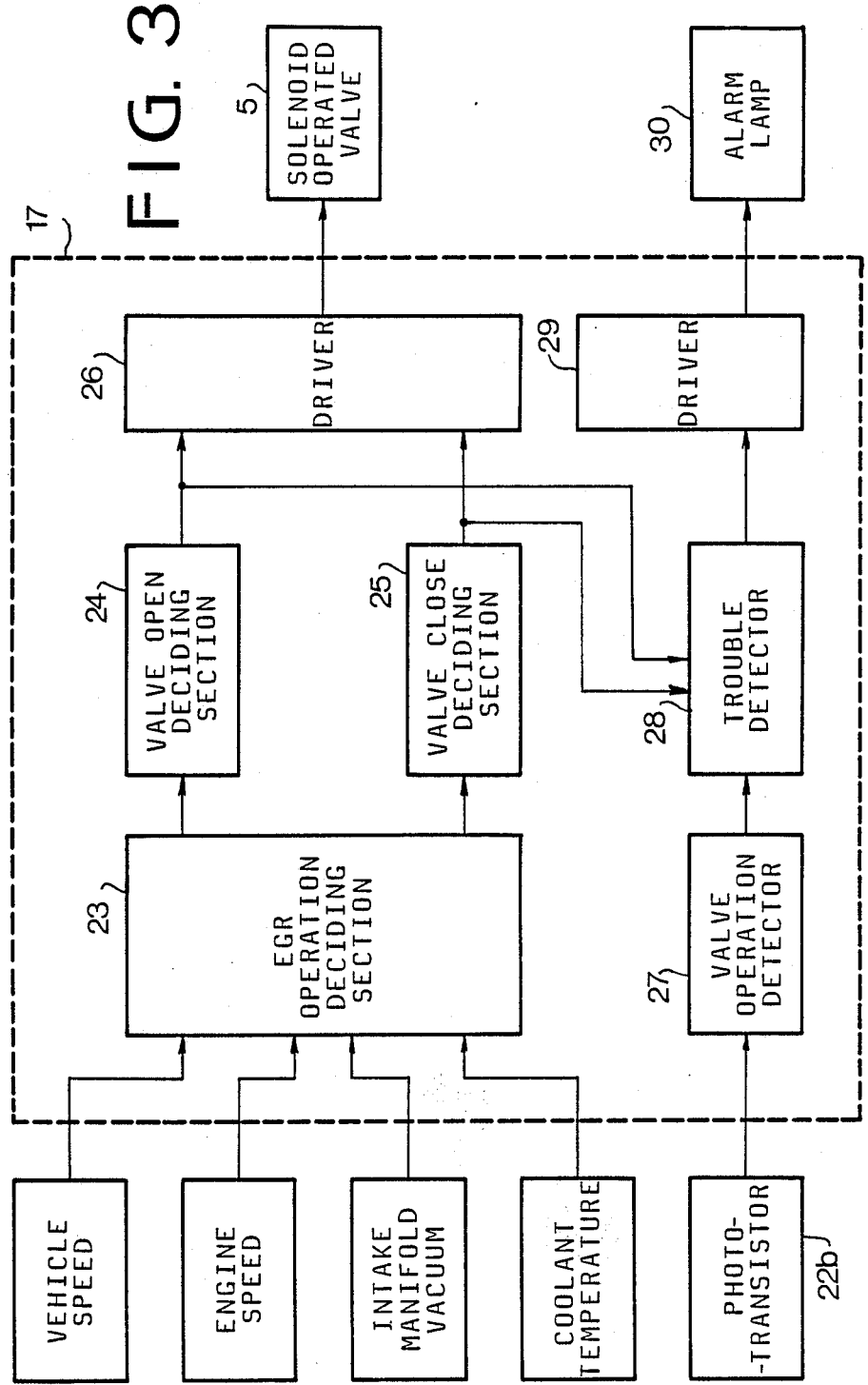

DIAGNOSING SYSTEM FOR AN EXHAUST GAS RECIRCULATION SYSTEM OF AN AUTOMOTIVE ENGINE

BACKGROUND OF THE INVENTION

The present invention relates to a system for diagnosing trouble of an exhaust gas recirculation system for an automotive engine.

If trouble or malfunction occurs in the exhaust gas recirculation (hereinafter called EGR) system, the amount of NOx in the exhaust gases increases. Accordingly, a diagnosing system is provided for the EGR system so as to provide an alarm of the trouble or malfunction of the EGR system.

The troubles of the EGR system are for example sticking of a valve body of the EGR valve to a seat and tearing of a diaphragm. Therefore, for diagnosing the EGR system, it is necessary to accurately detect the operation of the EGR valve, and further, desirable to employ a detecting means having longer durability.

Japanese Patent Laid Open No. 55-123345 discloses a diagnosing system for the EGR system which produces an alarm when the opening degree of an EGR valve detected by a potentiometer deviates from a desired value over a predetermined allowable range.

The potentiometer has a sliding contact engaging with a resistance element, for detecting the EGR valve opening degree. However the contacts are subject to fail to produce a proper signal due to deterioration of the contacts, for example rust caused by salt included in the atmosphere.

SUMMARY OF THE INVENTION

The object of the present invention is to provide a diagnosing system wherein a durable detecting means may accurately detect the operation of a EGR valve.

According to the present invention, there is provided a diagnosing system for an exhaust gas recirculation system having an EGR passage communicating an exhaust pipe of an engine with an intake passage of the engine, an EGR valve provided in the EGR passage, control means for producing a valve operating signal for operating the EGR valve in accordance with engine operating conditions, the diagnosing system comprising a photoelectric transducer provided for detecting position of the EGR valve and for producing a position signal dependent on the position of the EGR valve, and means responsive to the valve operating signal and to the position signal for producing a trouble signal as an alarm signal when the photoelectric transducer produces a position signal representing a valve state which does not accord with the valve operating signal.

In an aspect of the invention, the photoelectric transducer comprises a photodiode and a phototransistor.

The other objects and features of this invention will become understood from the following description with reference to the accompanying drawings.

BRIEF DESCRIPTION OF DRAWINGS

FIG. 1 is a schematic diagram of a system according to the present invention;
FIG. 2 is a perspective view showing a valve position detector; and
FIG. 3 is a block diagram of a control unit.

DETAILED DESCRIPTION OF THE PREFERRED EMBODIMENT

Referring to FIG. 1, an automotive engine 1 has a carburetor 2 communicated with an intake manifold 3 and an exhaust pipe 4. The exhaust pipe 4 is communicated with the intake manifold 3 at a turning point 3a, passing through an EGR passage 13 and an EGR valve 6. The EGR valve 6 has a vacuum chamber 9 defined by a diaphragm 8 in a housing 7, a valve body 11 secured to the diaphragm 8, and a spring 10 for urging the diaphragm 8 to press the valve body 11 against a valve seat 12 defining a valve port. The vacuum chamber 9 is communicated become the intake passage in the carburetor 2 at a signal port 15 provided just above a swinging end of a closed throttle valve 14, passing through a passage 16 and a solenoid operated valve 5.

A detected means 20 for detecting the position of the valve body 11 of the EGR valve 6 is provided above the EGR valve 6. The detecting means 20 has a cover 21 on the top of the housing 7 into which a shaft 11a connected with the valve body 11 extends. A valve position detector 22 is provided inside the cover 21. As shown in FIG. 2, the valve position detector 22 comprises a photodiode 22a and a phototransistor 22b which are mounted on opposite sides of a U-shaped holder 22c to form a photoelectric transducer. When the EGR valve is opened, the shaft 11a is raised so as to intercept light emitted from the photodiode 22a, so that the phototransistor 22b becomes inoperative. Thus, the opening of the EGR valve can be optically detected.

Referring to FIG. 3, the output signal of the phototransistor 22b is fed to a valve operation detector 27 in a control unit 17. The control unit 17 produces a signal in accordance with the operating state of the EGR valve. The control unit 17 has an EGR operation deciding section 23 which is applied with signals of vehicle speed, engine speed, coolant temperature and intake manifold vacuum. The section 23 feeds a valve open signal to a valve open deciding section 24 and a valve close signal to a valve close deciding section 25 in accordance with the driving condition of the vehicle and engine operating conditions. Each of the output signals of both sections 24 and 25 is applied to the solenoid operated valve 5 through a driver 26.

On the other hand, the output signals of the valve operation detector 27, of valve open deciding section 24 and of valve close deciding section 25 are applied to a trouble detector 28. The trouble detector 28 produces a trouble signal when the position of the valve body 11 is not in a position in accordance with the output signals of the sections 24 and 25. The trouble signal is fed to an alarm lamp 30 through a driver 29.

In operation, when the EGR operation deciding section 23 produces the valve open signal in accordance with input signals representing engine operating conditions and vehicle driving conditions, the valve open deciding section 24 produces the output signal, so that the solenoid operated valve 5 is opened. Accordingly, low pressure in the intake manifold 3, which is dependent on the opening degree of the throttle valve 14, is applied to the vacuum chamber 9 to open the EGR valve 6. Thus, a part of the exhaust gas is recirculated to the engine.

However, when the valve body 11 is stuck or the diaphragm 8 has a cut, rendering the movement of the valve body 11 impossible, the phototransistor 22b is either constantly operative or not operative at all. If the output signal of the valve operation detector 27 supplied to the trouble detector 28 indicates that the EGR valve 6 is closed under the condition of existence of the output signal of the valve open deciding section 24, the trouble signal is produced. The trouble detector 28 also produces the trouble signal when the EGR valve is opened while the output signal of the valve close deciding section 25 is supplied. Thus, the lamp 30 is lighted to provide an alarm of the trouble of the EGR valve.

In another embodiment of the present invention, the valve position detector 22 may be disposed in the atmosphere chamber 9a of the EGR valve 6.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A diagnosing system for an exhaust gas recirculation system having an EGR passage communicating an exhaust pipe of an engine with an intake passage of the engine, an EGR valve provided in the EGR passage, control means for producing a valve operating signal for operating the EGR valve in accordance with engine operating conditions, the diagnosing system comprising
   means for detecting the position of the EGR valve and for producing a position signal dependent on the position of the EGR valve;
   trouble detector means responsive to the valve operating signal and to the position signal for producing a trouble signal as an alarm signal when the detecting means produces a position signal of an actual closed state of the EGR valve and the control means produces a valve operating signal representing an open state of the EGR valve,
   said detecting means is a photoelectric transducer,
   the photoelectric transducer comprises a photodiode and a phototransistor,
   said transducer includes a shaft connected to a valve body of the EGR valve,
   said shaft is movable by movement of the valve body into a path between said photodiode and phototransistor, and
   said transducer includes a U-shaped holder having said photodiode and phototransistor facing each other on arms of the holder.

2. The diagnosing system according to claim 1 wherein said trouble detector means is further for producing the trouble signal as an alarm signal when the detecting means produces a position signal of an actual open state of the EGR valve and the control means produces a valve operating signal representing a closed state of the EGR valve.

3. The system according to claim 2, wherein
   said control means includes a valve open deciding means for providing a valve open signal representing said open state of the EGR valve for operating the EGR valve, said trouble detector means being responsive to said valve open signal, and
   said control means includes a valve closed deciding means for providing a valve closed signal representing said closed state of the EGR valve for operating the EGR valve, said trouble detector means being responsive to said valve closed signal.

4. The system according to claim 1, wherein said transducer including said photodiode and phototransistor is mounted by and inside a cover mounted centrally on top of a housing of said EGR valve adjacent a vacuum chamber of said EGR valve.

5. The system according to claim 4, wherein said transducer is mounted in an atmosphere chamber of said EGR valve.

6. The system according to claim 4, wherein
   said control means includes a valve open deciding means for providing a valve open signal representing said open state of the EGR valve for operating the EGR valve, said trouble detector means being responsive to said valve open signal, and
   said control means includes a valve closed deciding means for producing a valve closed signal representing said closed state of the EGR valve for operating the EGR valve, said trouble detector means being responsive to said valve closed signal.

7. The system according to claim 1, further comprising a solenoid valve communicating said intake passage at a port adjacent and above a swinging end of a throttle valve in closed position openably mounted in said intake passage with a vacuum chamber of said EGR valve.

8. The system according to claim 1, wherein said control means includes a valve open deciding means for providing a valve open signal representing said open state of the EGR valve for operating the EGR valve, said trouble detector means being responsive to said valve open signal.

9. The system according to claim 1, wherein said transducer is axially connected to the valve body of the EGR valve.

* * * * *